United States Patent

Bregeault

[11] 3,720,865
[45] March 13, 1973

[54] BRUSHLESS D.C. MOTOR
[75] Inventor: Marc Bregeault, Paris, France
[73] Assignee: Thomson-CSF, Paris, France
[22] Filed: March 24, 1972
[21] Appl. No.: 237,629

Related U.S. Application Data
[63] Continuation-in-part of Ser. No. 30,460, April 21, 1970, abandoned.

[30] Foreign Application Priority Data
April 29, 1969 France.................................6913570

[52] U.S. Cl..................318/138, 318/254, 318/439, 318/696
[51] Int. Cl.............................................H02k 29/00
[58] Field of Search.......318/254, 696, 683, 138, 439

[56] References Cited
UNITED STATES PATENTS

3,197,685  7/1965  Hetzel.............................318/254 X
3,418,550  12/1968  Kolatolowicz....................318/254 X
3,671,826  6/1972  Newell................................318/696

Primary Examiner—James D. Trammell
Assistant Examiner—Harvey Fendelman
Attorney—Edwin E. Greigg

[57] ABSTRACT

A brushless D. C. motor has a stator, the windings of which are connected to a D. C. source through the medium of pairs of switches in such a manner that these windings are permanently fed and that the current is reversed in the windings at the moment when no counterelectromotive force is induced therein, this winding being at this moment put in series with at least one other winding in which the counterelectromotive force induced is not zero.

7 Claims, 31 Drawing Figures

$\theta = 54° + \varepsilon$

Fig 6b $\theta = 90° + \varepsilon$

Fig 6c $\theta = 126° + \varepsilon$

$\theta = 162° + \varepsilon$

Fig 6d

$\theta = 198° + \varepsilon$

Fig 6e $\theta = 234° + \varepsilon$

Fig 6f $\theta = 270° + \varepsilon$

$\theta = 306° + \varepsilon$

Fig 6i $\theta = 342° + \varepsilon$

Fig 6j $\theta = 2\pi + 18° + \varepsilon$

BRUSHLESS D.C. MOTOR

This application is a continuation-in-part of my copending application Ser. No. 30,460, filed Apr. 21, 1970 now abandoned.

The present invention related to improvements to brushless D.C. motors, and more particularly to stator windings thereof and their supply arrangements. In brushless D.C. motors there is provided a permanent magnet forming at least one pair of north-south poles and driven to rotate by means of a rotating electromagnetic field. This rotating field may be set up by three or more windings regularly disposed around the permanent magnet and supplied by means of a D.C. source. For producing the rotation of the resultant magnetic field, the sense in which current flows in each winding must be reversed at the instant where a pole passes before the winding. At this instant the back electromotive force is cancelled while the applied voltage remains constant. This results in an increased current and in a consequent reduction of the efficiency.

It should be noted that while a pole is passing before a winding, a decrease appears in the motor torque, because at that instant the torque produced by this commutated winding is null. The total torque, however, does not fall to zero to the contribution of the other windings. Nevertheless, in the interest of efficiency of the motor, the current flowing in the commutated winding should be as small as possible.

Assuming three stator windings are connected in parallel between the two terminals of a D.C. source having a source potential of U volts, the current flowing in each winding can be determined from the expression:

$$I = U/R - e/R$$

R being the resistance value of the winding and $e$ the counterelectromotive force generated in the winding. When a pole of the permanent magnet passes before a winding, i.e., when the motor torque produced by the winding is zero, the counterelectromotive force $e$ in this winding is zero. The current $I'$ flowing therein is $$I' = U/R > I$$

which is not the smallest possible; on the contrary the current is larger than that flowing in the other windings, thus resulting in a decrease in motor efficiency.

It is an object of this invention to avoid this drawback.

According to the invention, there is provided a brushless D.C. motor comprising a stator having $q$ windings with $q > 1$, a rotor having at least one pair of poles, detector means for detecting the rotor position for determining the instant at which the counterelectromotive force induced by the rotor in a winding is zero and the direction of the current flowing therein is to be reversed, switching means for reversing said current, said means being controlled by said detector means and being respectively associated with said windings for so connecting them to a D.C. source that all the windings are fed permanently, that the current flowing in certain windings is smaller than that flowing in other windings and that the winding in which the direction of current is being reversed is one of these certain windings, the winding in which the counterelectromotive force is zero being at this instant in series with at least one otherwinding in which this force is not zero.

For a better understanding of the invention and to show how the same may be carried into effect reference will be made to the drawing accompanying the ensuing description and in which.

Figure 1:
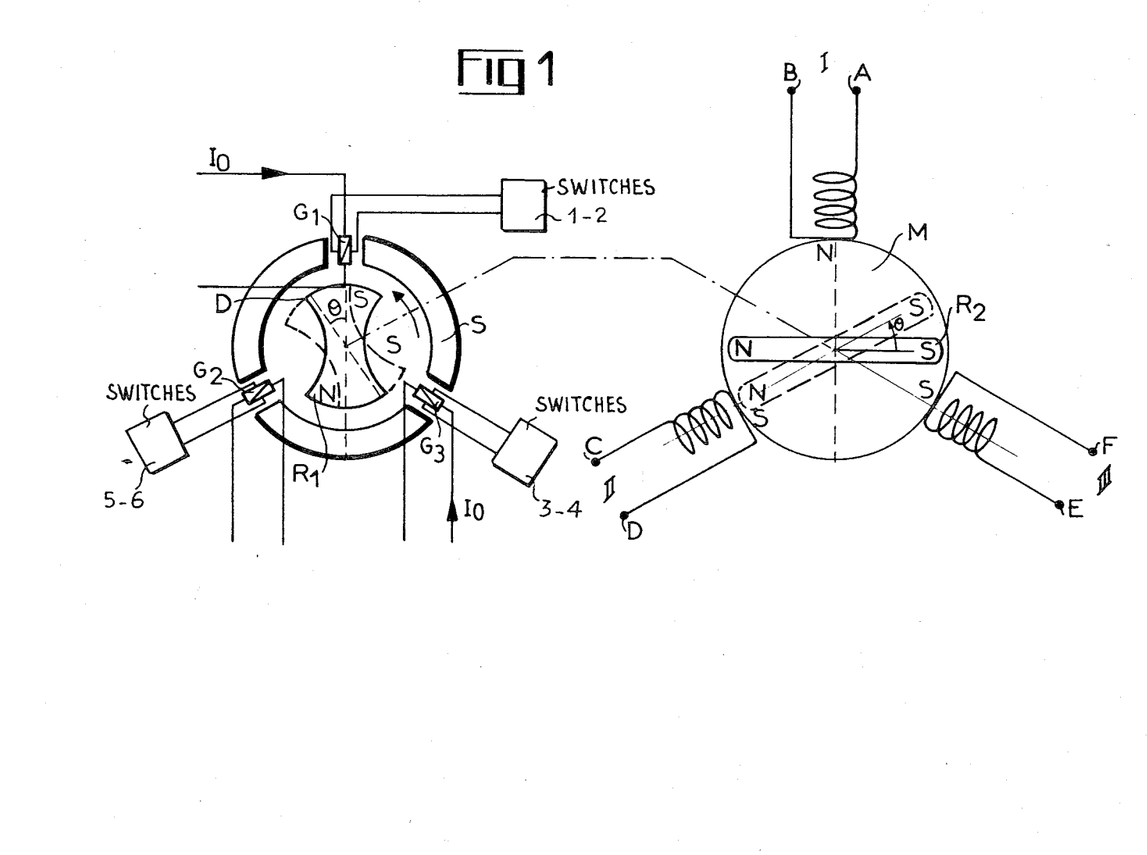
FIG. 1 diagrammatically illustrates a D.C. motor in accordance with the invention.
Figure 2:
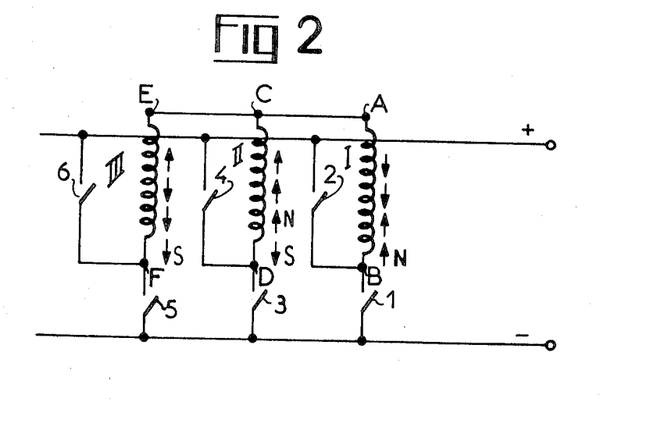
FIG. 2 illustrates the manner in which the stator windings of the motor element shown in FIG. 1 are connected to the source.
Figure 3A:
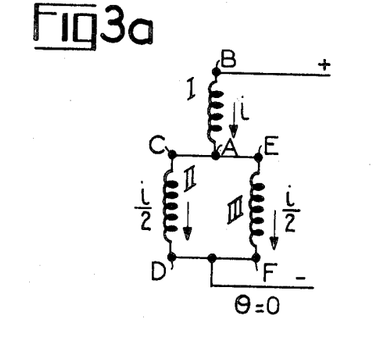
FIGS. 3a to 3c illustrate the diagrams of the supply circuit for the stator winding.
Figure 3B:
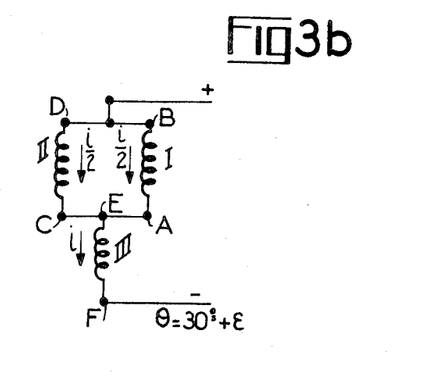

FIG. 1 illustrates a D.C. motor in accordance with the invention, in a preferred embodiment. It comprises a detector element D with a rotor R1 and a stator S carrying three Hall generators $G_1$, $G_2$, $G_3$, and a motor element M formed by a permanent bipolar magnet rotor $R_2$ and a stator carrying three windings I, II and III spaced by $2\pi/3$ from one another. These windings are connected to a D.C. source through the medium of three pairs of switches 1 to 6 (each pair forming an inverter device), in the manner shown in FIG. 2. The switches 1 to 6 may, for example, be semi-conductor devices or sealed-tube contacts controlled in a conventional manner as shown, for example, in FIG. 11. They are controlled by three Hall generators $G_1$, $G_2$ and $G_3$ of the detector element D. The supply circuit diagrams for the windings are shown in FIG. 3, for three positions of the rotor $R_2$. When the switches 2, 3, 5 are closed and the switches 1, 4, 6 are open, the winding I passes a current $i$ while the windings II, III are placed in parallel and pass a current $i/2$ which flows in a direction reverse to that flowing through the winding I. When the rotor $R_2$ passes through the axis of the winding II ($\theta = 30°$ in FIG. 1), this corresponding to a zero counterelectromotive force, the switch 4 closes while the switch 3 opens and the diagram $b$ of FIG. 3 is obtained in which the winding III passes a current $i$ flowing in one direction while in the windings I and II a current $i/2$ flows in the other direction; the counterelectromotive force in the winding II is zero.

Figure 3C:
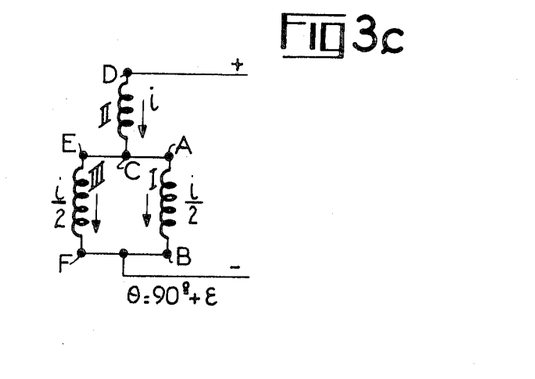

In FIG. 3c ($\theta = 90° + \epsilon$), the switches 1, 4 and 5 are closed and the switches 2, 3 and 6 open. The current flowing through the winding I changes direction without changing its absolute value, while in the winding II the current changes from $i/2$ to $i$ without changing direction.

Referring now to FIG. 3, it will be seen that each winding I, II and III is associated with a pair of switches 1, 2; 3, 4; and 5, 6 respectively. Each pair constitutes an inverter. The connections are so provided that there is always between the terminals of the D.C. source supplying the windings, two groups of windings in series. One of the group comprises one winding only within which a current $i$ flows and the second group comprises two windings in parallel in which a current $i/2$ flows in each winding.

This arrangement provides two important advantages. First, the winding within which current flow is to be reverse, i.e., the winding controlled by the relevant Hall detector, and wherein the counterelectromotive force is zero, is always in series with a winding in which the counterelectromotive force is not zero. Thus, the current increase or change is limited. Second, the commutated winding is traversed by a current $i/2$ before the commutation as well as after the commutation which also improves the efficiency.

Figure 11:
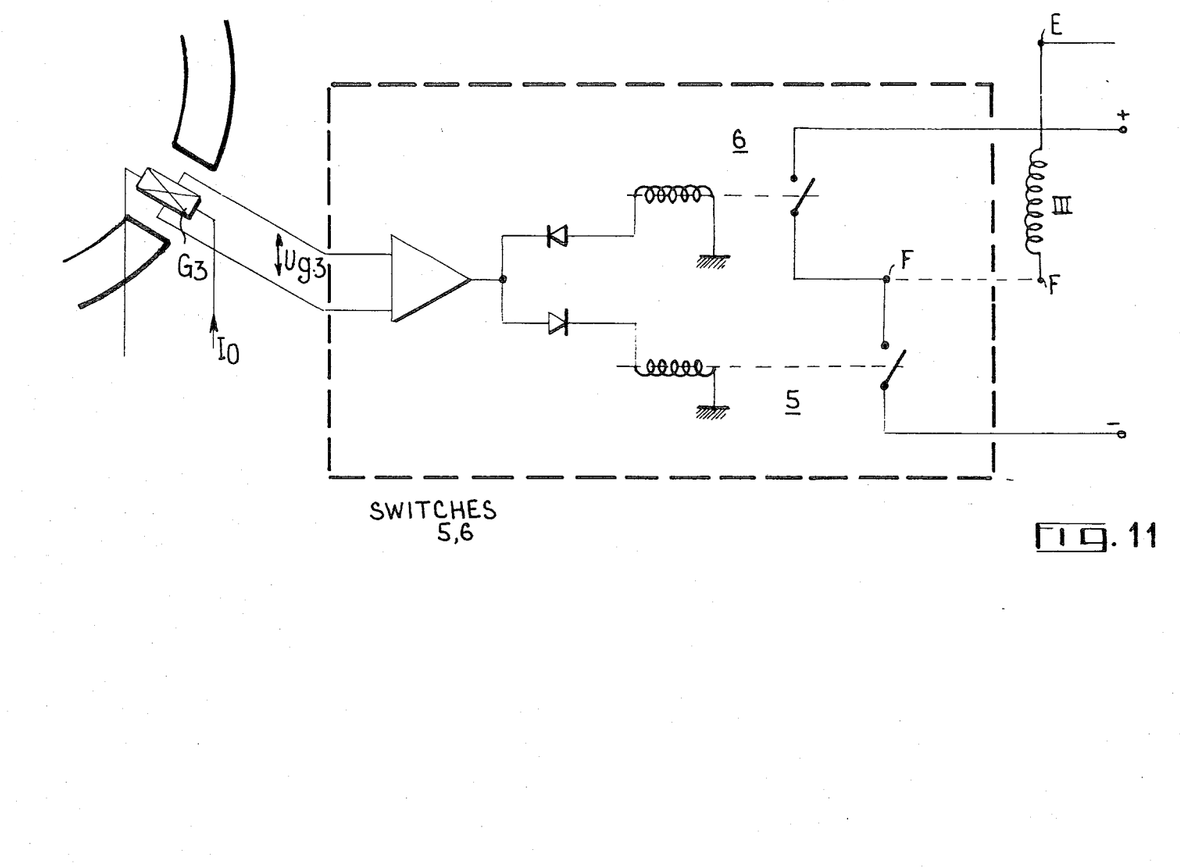
FIG. 11 is an illustrative example of switching means controlled by a Hall detector for reversing current in the commutated stator winding.

The switching of the windings I, II, III in response to signals derived from the Hall generators $G_1$, $G_2$ and $G_3$ may be accomplished by the illustrative arrangement shown in FIG. 11, the switching pairs of inverter circuit being contained within the dash lines. Only one winding III and its relevant Hall detector $G_3$ are illustrated in the drawing, and it should be readily apparent that terminal E is connected to terminals C and A of windings II and I which are, in turn, connected through associated inverters 3, 4 and 1, 2 to their relevant detectors $G_2$ and $G_1$, respectively.

The inverter embodies two electro-mechanical relays, the switching contacts of which are connected in series between the + and − terminals of the D.C. source. The common connection point of the switch contacts is connected to terminal F of winding III.

The control windings of each relay is connected in series with a poled diode to the output of an amplifier, the input of which is connected across the output of Hall detector $G_3$. The voltage output $Ug_3$ of the detector $G_3$ is a periodic voltage the sign of which changes when a pole of the permanent magnet passes before the detector and consequently before the winding as shown in the voltage diagram of FIG. 9. The amplifier amplifies the continuous input signal and applies the signal via oppositely poled diodes to the control windings. By virtue of the fact that the diodes are connected in opposite sense, one diode applies positive signals to the control winding of switch 5 and the other diode applies negative signals to the control winding of switch 6. With no signal applied, the two switches are open as shown, but in operation this never occurs. A positive output from the amplifier causes switch 5 to close while switch 6 is open. A negative output from the amplifier reverses the positions of the switches.

Thus, at the instant where the counterelectromotive force in a winding is zero, the current is small therein and this winding is always put in series with at least one other winding in which the counterelectromotive force is quite substantial and as a consequence the motor efficiency increases. This remark is also valid in the following embodiments.

Figure 4:
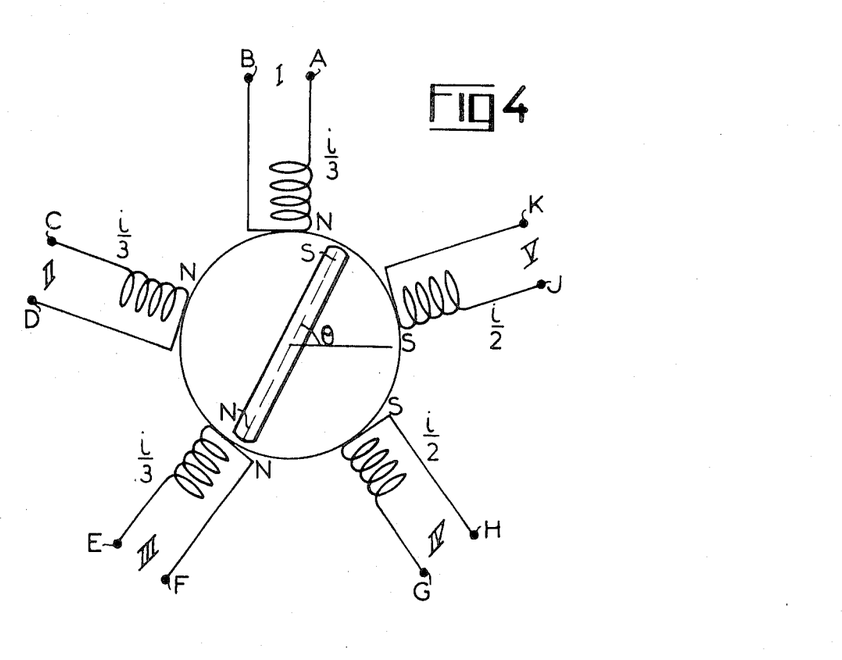
FIG. 4 diagrammatically shows a motor element having a stator equipped with five stator windings.
Figure 5:
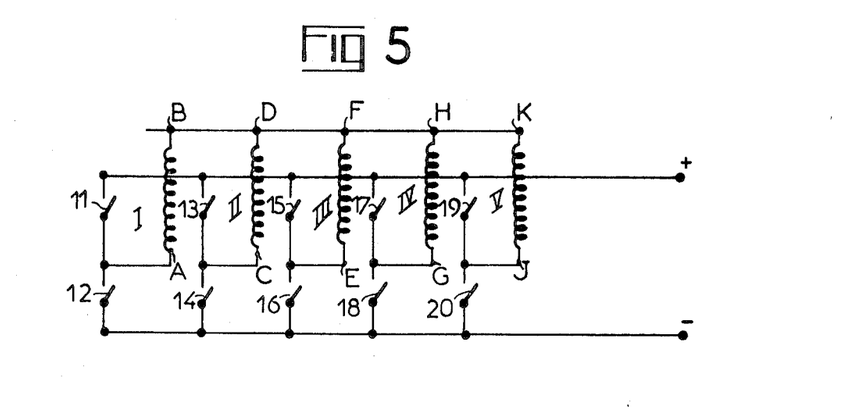
FIG. 5 shows how the windings of FIG. 4 are connected to the D.C. source.

FIG. 4 illustrates a D. C. motor in accordance with the invention, the motor element of which comprises a bipolar rotor and a stator having five windings I, II, III, IV and V, spaced apart by $2\pi/5$ from one another and connected to a D. C. source in the manner shown in FIG. 5, through the medium of five pairs of switches 11 to 20 arranged in such fashion in the circuit of the windings that will they sequentially open and close, the successive winding diagrams of FIGS. 6a to 6j, are obtained. For the angular position of the rotor of the motor element $\theta = 54° - \epsilon$, corresponding to the instant which precedes the passage of the pole N of this rotor through the axis of the winding III, the switches 11, 13, 16, 18 and 20 are closed and switches 12, 14, 15, 17 and 19 are open. In the windings I and II, there flows a current $i/2$ and in the coils III, IV, V a current $i/3$ in the reverse direction. For $\theta = 54° + \epsilon$ the switch 15 closes again and the switch 16 opens, the current flowing through the coil III changes direction while its value remains at $i/3$, and the current through the windings IV and V is no change in direction.

Figure 6A:
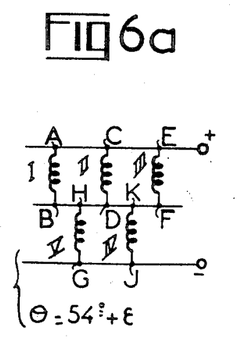
FIGS. 6a to 6j show how the stator windings are interconnected.
Figure 6B:
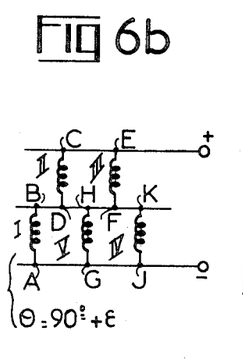
Figure 6C:
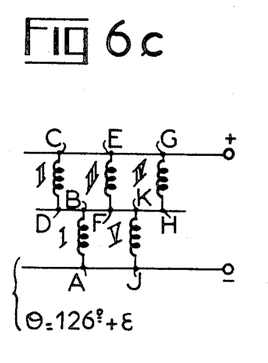
Figure 6D:
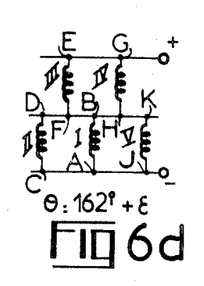
Figure 6E:
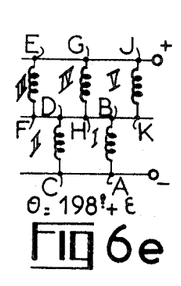
Figure 6F:
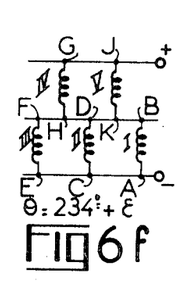
Figure 6G:
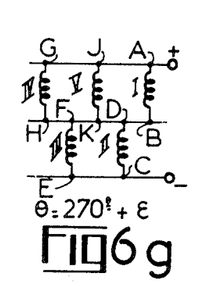
Figure 6H:
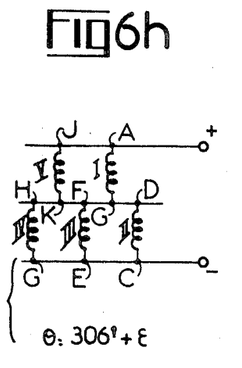
Figure 6I:
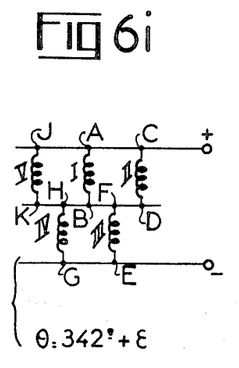
Figure 6J:
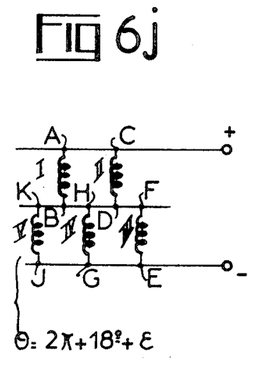

With each rotation of the rotor through 36° from position $\theta = 54°$ (FIG. 4) taken as the initial position, two switches will operate, giving the successive diagrams 6a, 6b, 6c . . . 6j, 6a, the rotor having completed a full revolution for $\theta = 54° + 2\pi$ (FIG. 6a). On passing from $\theta = 90° - \epsilon$ to $\theta = 90° + \epsilon$, the switches 14 and 12 operate; the switch 14 which was closed, opens, and the switch 12, which was open, closes. For $\theta = 126°$, it is the switches 18 and 17 will operate and so on.

It will be seen that these switches operate in pairs and can be replaced as in the case of a stator with three coils, by inverters (one inverter per pair of switches).

Figure 7:
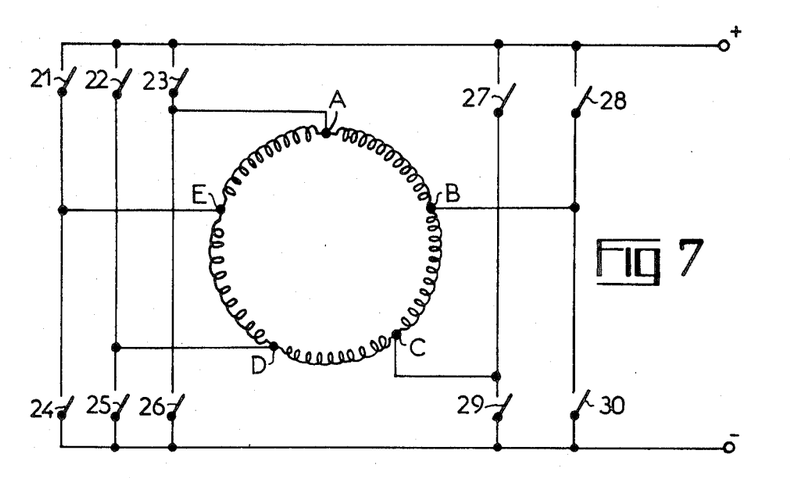
FIG. 7 shows diagrammatically a stator equipped with five windings in series, and the associated switching devices.
Figure 8A:
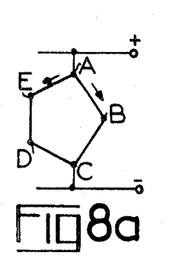
FIGS. 8a–8j show how the windings of FIG. 7 may be interconnected.
Figure 8B:
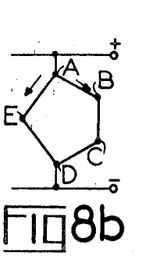
Figure 8C:
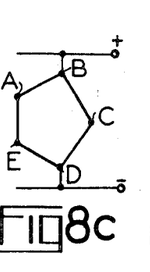
Figures 8D, 8E:
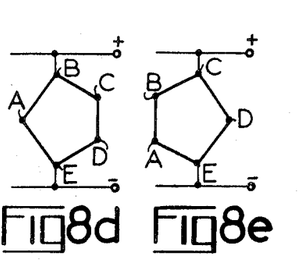
Figure 8F:
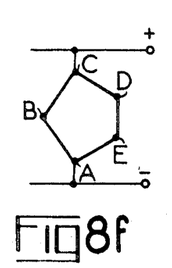
Figure 8G:
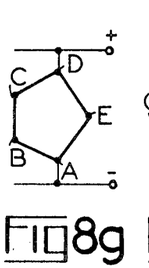
Figure 8H:
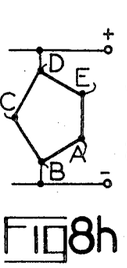
Figure 8I:
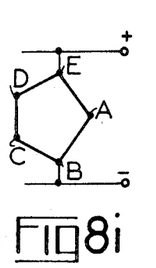
Figure 8J:
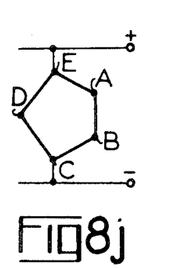

FIG. 7 illustrates a stator with five windings arranged in series, and FIGS. 8a to 8j illustrate the manner in which they are successively connected to the source by means of the switches 21 to 30 of FIG. 7 (these latter can of course be replaced by five inverters). Thus, when the switches 23 and 29 of FIG. 7 are closed, all the others being open, the circuit diagram of FIG. 8a is obtained. Subsequently the switch 29 opens and the switch 25 closes (diagram of FIG. 8b), then the switch 23 opens and the switch 28 closes (diagram of FIG. 8c), and so on.

Figure 9:
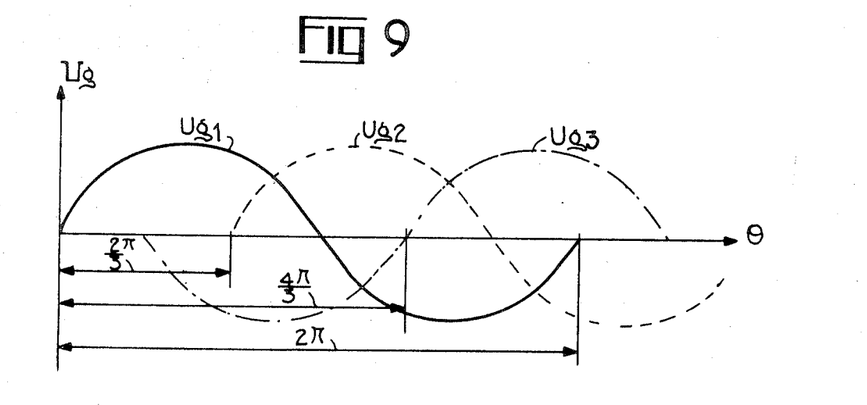
FIGS. 9 and 10 are explanatory graphs.
Figure 10:
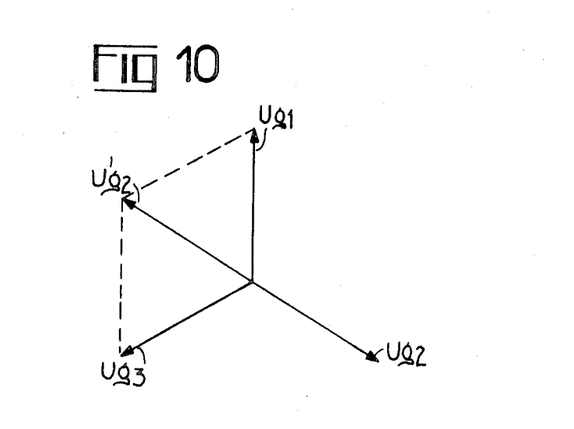

FIG. 9 illustrates how a D.C. motor in accordance with the invention with three stator windings in the motor element and only two Hall generators in the detector element, is made to operate. The voltages $Ug_1$ and $Ug_2$ produced by two Hall generators, are given as a function of the angle $\theta$ of the rotor, the generators being spaced apart by angles of $2\pi/3$ from one another. The third voltage $Ug_3$ is obtained by taking the reciprocal of the sum of the voltages $Ug_1$ and $Ug_2$ as shown in FIG. 10.

Of course, the invention is in no way limited to the embodiments described and illustrated which are given solely by way of examples.

It will be observed, in particular, that in order not to overburden the drawings, the inverter device associated with the second extremity of a coil has always been illustrated in the form of two switches; it goes without saying that each pair of switches may often quite advantageously be replaced by an inverter although it may be preferred to use two switches for reasons of purely technological order.

That which is claimed is:

1. A brushless D.C. motor comprising a stator having $q$ windings with $q > 1$, a rotor having at least one pair of poles, detector means for detecting said rotor position relative to said stator windings, arranged to determine the instant at which the counterelectromotive force induced by said rotor in at least one of said windings is zero, the occurrence of said instant resulting in a reversement in the direction of the current flowing therein, switching means for operating said current reversement, said switching means being controlled by said detector means and being respectively associated with said windings for so connecting them to a D.C. source that all the windings are fed permanently, that the current flowing in certain windings is smaller than that flowing in other windings and that the winding in which the direction of current is being reversed, is one of these certain windings, the windings in which the counterelectromotive force is zero being at that instant in series with at least one other winding in which this force is not zero.

2. A motor as claimed in claim 1, wherein said switching means arranged for forming at any instant a first group of $n$ windings wherein $n$ is comprised between 1 and $q-1$ and a second group of windings comprising the remaining windings and wherein the current is lower than in said first group and for switching, while reversing the current in one at said windings, the windings of the first group into the second group and reciprocally except for that winding in which the current is being reversed and which remains in the same group.

3. A motor as claimed in claim 2, wherein $q$ is odd.

4. A motor as claimed in claim 3, wherein $n$ is equal to $q-1/2$ said windings being connected in series in each of said groups.

5. A motor as claimed in claim 3, said windings are connected in parallel in each of said groups.

6. A motor as claimed in claim 1, wherein said switching comprises pairs of first and second relay operated switches alternately positioned between open and closed positions in response to said detector means, each pair being associated with one winding.

7. A motor as claimed in claim 6, wherein said first and said second switching means of each pair are connected in series, the common junction of said first and second switches of each pair being connected to one end of said one winding, the other end of said one winding being connected in common.

* * * * *